United States Patent
Bui

(10) Patent No.: US 7,263,088 B2
(45) Date of Patent: Aug. 28, 2007

(54) SIGNALLING SCHEME FOR HIGH SPEED DOWNLINK PACKET ACCESS

(75) Inventor: Thanh Ngoc Bui, Victoria (AU)

(73) Assignee: NEC Corporation, Tokyo (JP)

( * ) Notice: Subject to any disclaimer, the term of this patent is extended or adjusted under 35 U.S.C. 154(b) by 897 days.

(21) Appl. No.: 10/408,782

(22) Filed: Apr. 8, 2003

(65) Prior Publication Data
US 2004/0047321 A1 Mar. 11, 2004

(30) Foreign Application Priority Data
Apr. 9, 2002 (AU) ................................ PS 1647
Dec. 11, 2002 (AU) ............................. 2002315928

(51) Int. Cl.
H04Q 7/24 (2006.01)
H04J 11/00 (2006.01)
H04L 1/18 (2006.01)

(52) U.S. Cl. ............... 370/338; 370/328; 370/208; 714/748

(58) Field of Classification Search ......... 370/328, 370/338, 207, 208; 714/748
See application file for complete search history.

(56) References Cited

U.S. PATENT DOCUMENTS

| 7,027,782 B2* | 4/2006 | Moon et al. .......... 455/102 |
| 2003/0123470 A1* | 7/2003 | Kim et al. ............ 370/437 |
| 2003/0147371 A1* | 8/2003 | Choi et al. ............ 370/341 |
| 2004/0028020 A1* | 2/2004 | Frederiksen et al. .... 370/342 |
| 2005/0094615 A1* | 5/2005 | Kim et al. ............ 370/349 |
| 2005/0105494 A1* | 5/2005 | Kim et al. ............ 370/335 |

FOREIGN PATENT DOCUMENTS

GB 2 388 751 A * 11/2003

* cited by examiner

*Primary Examiner*—Duc M. Nguyen
(74) *Attorney, Agent, or Firm*—Foley & Lardner LLP

(57) ABSTRACT

A method of signalling in a mobile communications network (2) from a base station (10) to a mobile station (12, 14, 16) using Hybrid Automatic Repetition Request (HARQ), the method comprising the steps of:
selecting, at the base station, a code that indicates transmission of new data or retransmitted data;
providing in the code combinations of redundancy version parameters and/or bit rearrangement parameters; and
transmitting the selected code to the mobile station,
wherein the selected code has the effect of increasing the number of available combinations or reducing the number of bits required for HARQ signalling.

14 Claims, 3 Drawing Sheets

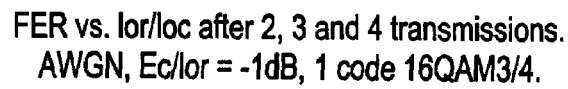
FIG. 3
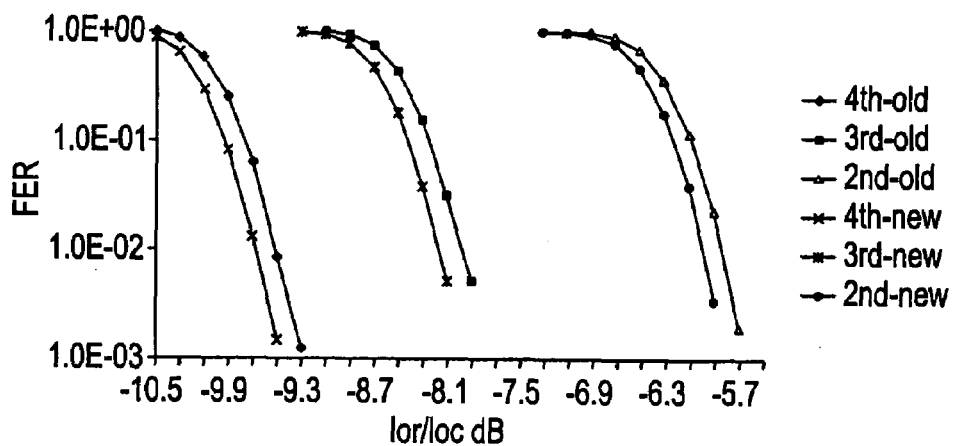
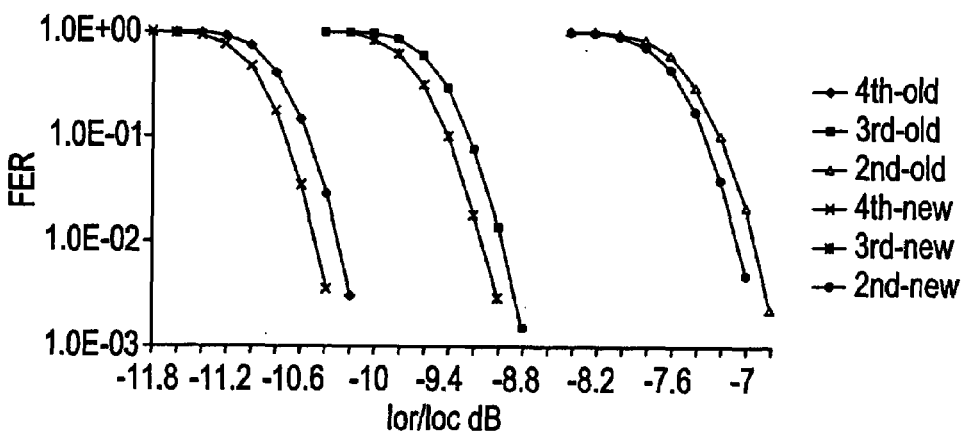

SIGNALLING SCHEME FOR HIGH SPEED DOWNLINK PACKET ACCESS

This invention relates to a method and system for signalling in a mobile communications network and more particularly to a method and system for an improved signalling scheme in using Hybrid Automatic Repeat Request (HARQ) in High Speed Downlink Packet Access (HSDPA).

HSDPA is one of the key features in third generation wireless communication standard wide band code division multiple access (W-CDMA) which is proposed to support multimedia services in a downlink direction. As the name implies, HSDPA brings high speed data delivery to third generation (3G) terminals, ensuring that users requiring effective multimedia capabilities benefit from data rates previously unavailable because of limitations in the radio access network. The radio access network is linked between the user's terminal and the base station in the mobile communications network.

Being part of Release 5 3rd Generation Partnership Project (3GPP) standard, all major mobile telephone manufacturers, 3G carriers and 3G players are currently working hard to achieve a feasible reliable and complete HSDPA feature. Upon the success of this feature, HSDPA will provide very high data rates in a downlink direction of up to 10 Mbps over 5 MHz bandwidth. With this particularly high data rate, high quality applications such as video streaming, interactive applications, and video on demand will be guaranteed. In order to reach this target the following key technologies have been investigated by 3GPP standard participants: Adaptive Modulation and Coding (AMC), Hybrid Automatic Repeat Request (HARQ), Multiple Input-Multiple Output (MIMO), fast cell selection (FCS), Standalone Downlink Shared Channel (DSCH) and downlink channel structure as examples.

So as to ensure the full and proper working of these features, signalling is required. At present, the HSDPA standard uses 4 bits dedicated to redundancy version and a New Data Indicator (NDI). It would be desirable to either reduce the number of bits used for these aspects of the signalling and thereby provide greater capacity for coding or maintain the use of the 4 bits for redundancy version and new data indicator, but increase the number of combinations in the redundancy version to create more flexibility for the transmitting node in a mobile communications system to select from given the same signalling requirements.

A background to the HSDPA signalling system will now be described. Initially the downlink bit signalling requirement for HARQ comprised 3 bits for HARQ process number, 2 bits for redundancy version and 1 bit for new data indicator. Theoretically, 5 bits of signalling would be required for the redundancy version signalling, that is 1 bit for s, 2 bits for r, and 2 bits for b. There have previously been attempts to reduce the redundancy version signalling to 2 bits and 3 bits. The scheme of three bit signalling has been included in a new draft 3GPP Technical Report, referenced as TR 25.858 V 1.1.2, and thus the downlink signalling requirements for HARQ now is 3 bits for HARQ process number, 3 bits for the redundancy version and 1 bit for the new data indicator.

With regard to the 3 bit signalling scheme in an earlier draft, the redundancy version (RV) parameters r, s, and constellation version parameter b are coded jointly to produce the value $X_{rv}$. The value $X_{rv}$ is alternatively represented as the sequence $x_{rv1}$, $x_{rv2}$, $x_{rv3}$ where $x_{rv1}$ is the most significant bit. This is done according to the following tables depending on the modulation scheme used. Table 1 below shows redundancy version (RV) coding for 16 QAM (quadrature amplitude modulation) and Table 2 shows the RV coding for quadrature phase shift keying (QPSK).

TABLE 1

RV Coding for 16 QAM

| $X_{rv}$ (value) | s | r | b |
| --- | --- | --- | --- |
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 1 | 0 | 2 |
| 6 | 1 | 0 | 3 |
| 7 | 1 | 1 | 0 |

TABLE 2

RV Coding for QPSK

| $X_{rv}$ (value) | s | r |
| --- | --- | --- |
| 0 | 1 | 0 |
| 1 | 0 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |

The physical layer HARQ functionality matches the number of bits at the output of the channel coding (turbo encoder) to the total number of bits of the HS-DSCH physical channels. The HARQ functionality is controlled by the redundancy version (RV) parameters, that is the exact set of bits at the output of the physical layer HARQ functionality depends on the number of input bits, the number of output bits and the RV parameters.

The physical layer HARQ functionality consists of two rate matching stages as shown in FIG. 2. The first rate matching stage receives three streams of bits, one stream for systematic bits, one stream for parity 1 bits and the other third stream for parity 2 bits. The first rate matching stage is identical to the release 99 rate matching functionality except that the number of output bits does not match to the number of physical channel bits available in the HS-DSCH TTI (Transmission Time Interval). Instead, the number of output bits matches to the available user equipment soft-buffering capability, information about which is provided by higher layers. Note that if the number of input bits does not exceed the user equipment soft-buffering capability, the first rate matching stage is transparent.

The second rate matching stage matches the number of bits after first rate matching to the number of physical channel bits available in the HS-DSCH TTI. The second rate matching stage also uses the release 99 rate matching algorithm. However, the rate matching only considers bits that have not been punctured by the first rate matching stage and the rate matching parameters used in a particular transmission are controlled by the RV parameters.

In the second rate matching stage, commonly designated as channel rate matching, HARQ rate matching for the HS=DSCH transport channel is done with the general method described in section 4.2.7.5 of TS 25.212 with the following specific parameters. As mentioned previously, the parameters of the second rate matching stage depend on the value of the RV parameters s and r. The parameter s can take the value 0 or 1 to distinguish self-decodable (s=1) and non-self decodable (s=0) transmissions. The parameter r having a range from 0 to $r_{max}$ changes the initial error variable $e_{ini}$ in the case of puncturing. In the case of repetition both parameters r and s change the initial error variable $e_{ini}$. The parameters X, $e_{plus}$ and $e_{minus}$ are calculated as shown in Table 3 below.

TABLE 3

Parameters for HARQ second rate matching

| | $X_i$ | $e_{plus}$ | $e_{minus}$ |
|---|---|---|---|
| Systematic RM S | $N_{sys}$ | $N_{sys}$ | $|N_{sys} - N_{t,sys}|$ |
| Parity 1 RM P1_2 | $N_{p1}$ | $\alpha \cdot N_{p1}$ | $\alpha \cdot |N_{p1} - N_{t,p1}|$ |
| Parity 2 RM P2_2 | $N_{p2}$ | $\alpha \cdot N_{p2}$ | $\alpha \cdot |N_{p2} - N_{t,p2}|$ |

The number of bits before second rate matching occurs are denoted as $N_{sys}$ for the systematic bits, $N_{p1}$ for the parity 1 bits and $N_{p2}$ for the parity 2 bits respectively. The number of physical channels used for the coded composite transport channel (CCTrCH) is denoted by P. The number of bits available to the CCTrCH in one radio frame is denoted by $N_{data}$ and is equivalent to $P \times 3 \times N_{data1}$, where $N_{data1}$ is defined in TS25.212. The rate matching parameters are determined as follows:

For $N_{data} \leq N_{sys}+N_{p1}+N_{p2}$, puncturing is performed in the second rate matching stage. The number of transmitted systematic bits in a re-transmission is $N_{t,sys}=\min\{N_{sys}, N_{data}\}$ for a transmission of self-decodable type and $N_{t,sys}=\max\{(N_{data}-(N_{p1}+N_{p2})), 0\}$ in the non self-decodable case.

For $N_{data}>N_{sys}+N_{p1}+N_{p2}$, repetition is performed in the second rate matching stage. A similar repetition rate in all bit streams is achieved by setting the number of transmitted systematic bits to $$N_{t,sys} = \left\lfloor N_{sys} \cdot \frac{N_{data}}{N_{sys}+2N_{p2}} \right\rfloor$$

The number of parity bits in a transmission is $$N_{t,p1} = \left\lfloor \frac{N_{data}-N_{t,sys}}{2} \right\rfloor$$

and $$N_{t,p2} = \left\lceil \frac{N_{data}-N_{t,sys}}{2} \right\rceil$$

for the parity 1 and parity 2 bits respectively. Table 3 above summarises the resulting parameter choice for the second rate matching stage where the parameter a is chosen using a=2 for parity 1 and a=1 for parity 2.

The rate matching parameter $e_{ini}$ is calculated for each bit stream according to the RV parameters r and s using $e_{ini}(r)=\{[X_i-(r \cdot e_{plus}/r_{max})-1]\mod_{plus}\}+1$ in the case of puncturing, that is $N_{data} \leq N_{sys}+N_{p1}+N_{p2}$, and $e_{ini}(r)=\{[X_i-((s+2 \cdot r) \cdot e_{plus}/(2 \cdot r_{max}))-1]\mod_{plus}\}+1$ for repetition, that is $N_{data}>N_{sys}+N_{p1}+N_{p2}$. Where $r \in \{0, 1, \ldots, r_{max}-1\}$ and $r_{max}$ is the total number of redundancy versions allowed by varying r. Note that $r_{max}$ varies depending on the modulation mode.

Notes also for the modulo operation the following clarification is used: the value of (x mod y) is strictly in the range of 0 to y-1 (i.e. -1 mod 10=9).

The following is a description of the constellation version parameter b, otherwise known as the bit rearrangement parameter, as proposed in the current 3GPP Technical Report. The bit rearrangement only applies to 16 QAM modulated bits. In the case of QPSK it is transparent. Table 4 describes the operations that produce the different rearrangements.

TABLE 4

Bit re-arrangement for 16 QAM

| Bit rearrangement parameter b | Output bit sequence | Operation |
|---|---|---|
| 0 | $i_1 q_1 i_2 q_2$ | None |
| 1 | $i_2 q_2 i_1 q_1$ | Swapping $i_1$ with $i_2$ and $q_1$ with $q_2$ |
| 2 | $i_1 \overline{q_1 i_2 q_2}$ | XOR with 0011 (equivalent to inversion of the logical values of $i_2$ and $q_2$) |
| 3 | $i_2 q_2 \overline{i_1 q_1}$ | Swapping $i_1$ with $i_2$ and $q_1$ with $q_2$ and XOR with 0011 |

The bits of the input sequence are mapped into groups of four so that $v_{pk}$, $v_{pk+1}$, $v_{pk+2}$ and $v_{pk+3}$ map into $i_1 i_2 q_1 q_2$ where k mod 4=0. The output bit seq from Table 4 above map to the output bits in groups of 4, that is $r_{pk}$, $r_{pk+1}$ $r_{pk+2}$ and $r_{pk+3}$ where k mod 4=0. The above bit rearrangement for 16 QAM covers the physical channel mapping after interleaving whereby the bit streams undergo the bit rearrangement and are converted into physical channels.

The above description provides back ground as to the present state of the proposed signalling scheme in HSDPA. The present invention seeks to improve the signalling scheme by making at least 1 extra bit available for other coding implementation or providing extra combinations for use by Node-B (such as a base station) to select from to optimise the performance of data transmission (such as HS-DSCH).

According to a first aspect of the invention there is provided a method of signalling in a mobile communications network from a base station to a mobile station using Hybrid Automatic Repetition Request (HARQ), said method comprising the steps of:

selecting, at said base station, a code that indicates transmission of new data or retransmitted data;

providing in said code combinations of redundancy version parameters and/or bit rearrangement parameters; and transmitting the selected code to said mobile station, wherein the selected code has the effect of increasing the number of available combinations or reducing the number of bits required for HARQ signalling.

The method may further comprise the step of merging the new data indicator field with signalling values $X_{rv}$ that define each of said combinations. Preferably, when the new data indicator has a value of 1, it indicates a new data transmission. Preferably, when the new data indicator has a value of zero, it indicates retransmitted data.

The redundancy version parameters are s and r where s=1 indicates a self-decodable transmission and s=0 indicates a non-self-decodable transmission.

The selected code may include combinations of at least one of a self-decodable indicator, a redundancy version indicator and bit rearrangement parameter in order to improve orthogonality between self-decodable and non self-decodable redundancy versions.

Preferably, in a first transmission when NDI has a value of 1, parameter s will also have a value of one. Preferably, in said first transmission r has a value of zero and a bit rearrangement parameter b has value of zero.

The signalling values representing the combinations may be defined by either 3 bits, providing up to eight combinations, or 4 bits, providing up to sixteen combinations. Preferably, when the selected code has the effect of increasing the number of available combinations 4 bits are used. Preferably when the selected code has the effect of reducing the number of bits required for HARQ signalling, 3 bits are used.

Either QPSK or 16 QAM are preferably used as the modulation scheme for transmitting the selected code.

According to a second aspect of the invention there is provided a mobile communications signalling system which uses Hybrid Automatic Repetition Request (HARQ), comprising:

one or more base stations;

one or more mobile stations in radio communication with said base stations;

wherein at one of said base stations, a code is selected that indicates transmission of new data or retransmitted data; and in said code there is provided combinations of redundancy version parameters and/or bit arrangement parameters;

said selected code being transmitted to at least one of said mobile stations and having the effect of increasing the number of available combinations or reducing the number of bits required for HARQ signalling.

The signalling system may form part of the HSDPA scheme.

A preferred embodiment of the invention will hereinafter be described with reference to the drawings wherein:

FIG. 3 shows plots of link level simulation results.

Figure 1:
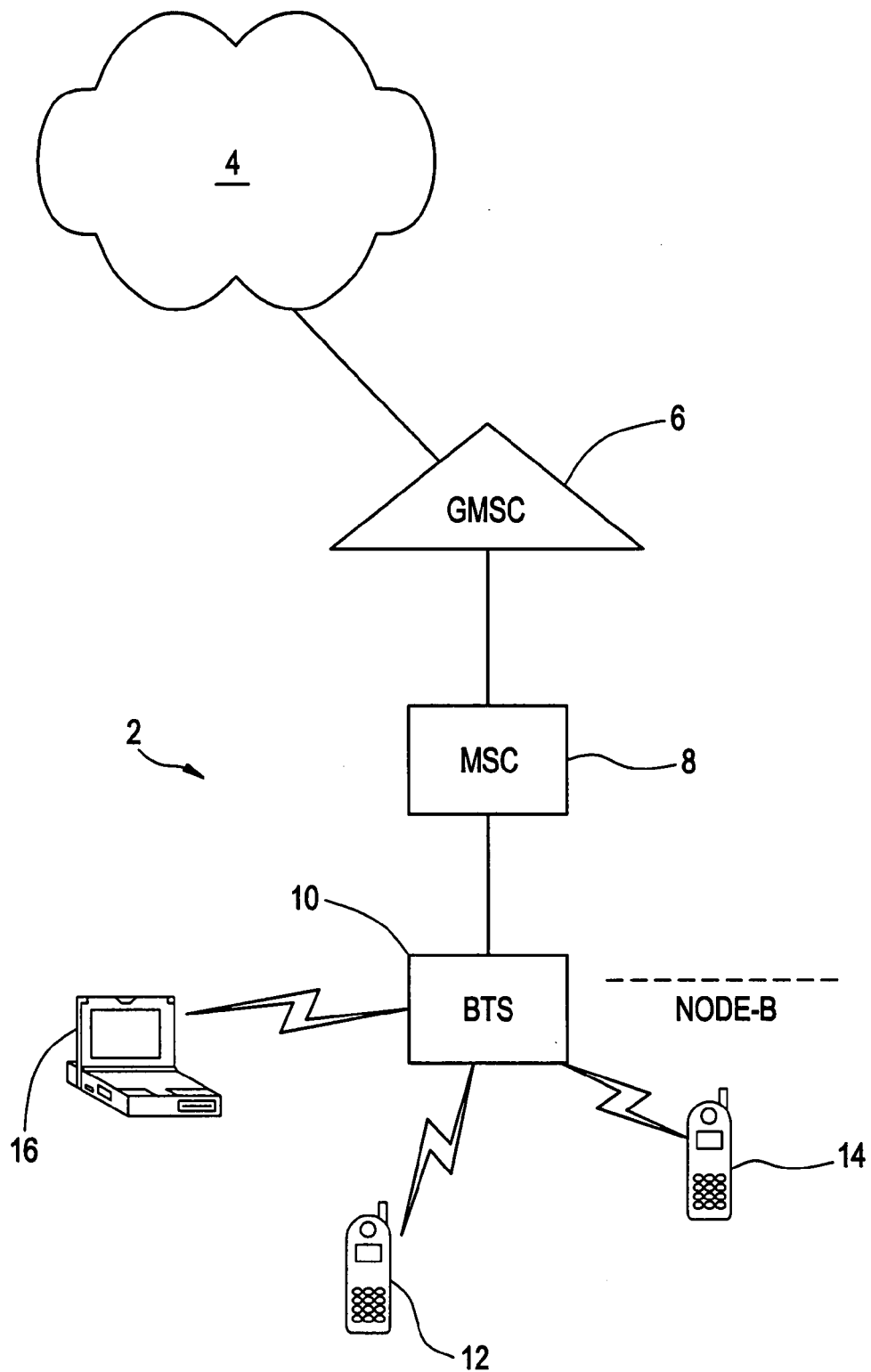
FIG. 1 is a block diagram of a simple mobile communications network including subscriber terminals.
Figure 2:
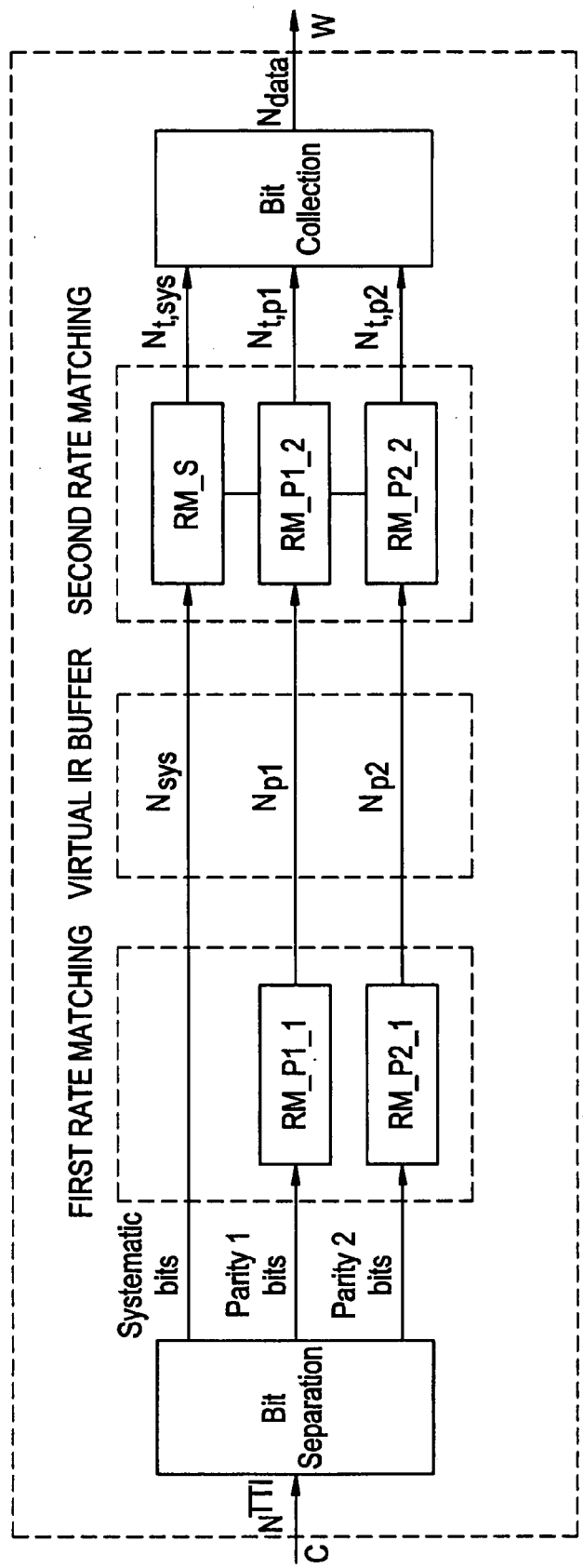
FIG. 2 is a block diagram of the physical layer HARQ functionality.

With reference to FIG. 1 there is shown a basic mobile communications network 2 which is linked to a further communication network 4 which may be the Internet for example. The mobile network 2 has a gateway mobile switching centre 6 which interfaces between the mobile network 2 and the communications network 4. It handles the subscriber data and signalling between the mobile network 2 and communications network 4. The mobile network 2 has a mobile switching centre 8 which is linked to at least one base transceiver station 10 which in turn may be in communication with any one of mobile stations 12, 14 or mobile PC 16, otherwise known as user equipment. The base transceiver station 10 is otherwise known as Node-B and it is the interface between the BTS 10 and the mobile station 12 or 14 for which the signalling scheme is proposed to be improved in the HSDPA protocol in the downlink direction, that is from BTS 10 to the mobile station.

With reference to Tables 1 and 2 described earlier, it is noted that the current proposals for downlink signalling requirements for HARQ is to use 3 bits for redundancy version and 1 bit for a new data indicator. This results in allowing only three bits for the signalling value for $X_{rv}$ whilst the other bit is solely used for the new data indicator.

In a preferred embodiment, the present invention uses the process to merge the NDI and signalling value ($X_{rv}$) fields into a more compact signalling format as shown in each of Tables 5, 6, 7 and 8 below.

TABLE 5

Table for 16 QAM-Option 1

| $X_{rv}$ (value) | NDI | s | r | b |
|---|---|---|---|---|
| 0 | 1 | 1 | 0 | 0 |
| 1 | 0 | 0 | 0 | 0 |
| 2 | 0 | 1 | 1 | 1 |
| 3 | 0 | 0 | 1 | 1 |
| 4 | 0 | 1 | 0 | 1 |
| 5 | 0 | 1 | 0 | 2 |
| 6 | 0 | 1 | 0 | 3 |
| 7 | 0 | 1 | 1 | 0 |

TABLE 6

Table for QPSK-Option 1

| $X_{rv}$ (value) | NDI | s | r |
|---|---|---|---|
| 0 | 1 | 1 | 0 |
| 1 | 0 | 0 | 0 |
| 2 | 0 | 1 | 1 |
| 3 | 0 | 0 | 1 |
| 4 | 0 | 1 | 2 |
| 5 | 0 | 0 | 2 |
| 6 | 0 | 1 | 3 |
| 7 | 0 | 0 | 3 |

TABLE 7

Table for 16 QAM-Option 2

| $X_{rv}$ (value) | NDI | s | r | b |
|---|---|---|---|---|
| 0 | 1 | 1 | 0 | 0 |
| 1 | 0 | 1 | 0 | 1 |
| 2 | 0 | 1 | 0 | 2 |
| 3 | 0 | 1 | 0 | 3 |
| 4 | 1 | 1 | 1 | 0 |
| 5 | 0 | 1 | 1 | 1 |
| 6 | 0 | 1 | 1 | 2 |
| 7 | 0 | 1 | 1 | 3 |
| 8 | 0 | 0 | 0 | 0 |
| 9 | 0 | 0 | 0 | 1 |
| 10 | 0 | 0 | 0 | 2 |
| 11 | 0 | 0 | 1 | 0 |
| 12 | 0 | 0 | 1 | 1 |
| 13 | 0 | 0 | 1 | 2 |
| 14 | 0 | 1 | 0 | 0 |
| 15 | 0 | 1 | 1 | 0 |

TABLE 8

Table for QPSK-Option 2

| $X_{rv}$ (value) | NDI | s | r |
|---|---|---|---|
| 0 | 1 | 1 | 0 |
| 1 | 1 | 0 | 0 |
| 2 | 1 | 1 | 1 |
| 3 | 1 | 0 | 1 |
| 4 | 1 | 1 | 2 |
| 5 | 1 | 0 | 2 |
| 6 | 1 | 1 | 3 |
| 7 | 1 | 0 | 3 |
| 8 | 0 | 1 | 0 |
| 9 | 0 | 0 | 0 |

TABLE 8-continued

Table for QPSK-Option 2

| $X_{rv}$ (value) | NDI | s | r |
|---|---|---|---|
| 10 | 0 | 1 | 1 |
| 11 | 0 | 0 | 1 |
| 12 | 0 | 1 | 2 |
| 13 | 0 | 0 | 2 |
| 14 | 0 | 1 | 3 |
| 15 | 0 | 0 | 3 |

By merging the bit field for NDI and signalling value it brings about two advantages. Namely, where 3 bits are used for a total of eight combinations of signalling value the extra bit can be used for coding purposes out of the original 4 bits that were proposed in the present downlink protocol. There is no need to increase the number of combinations, that is the redundancy version, but reduce the number of bits for the HARQ signalling requirement. Thus, 1 bit is saved and this saved bit as mentioned can be used for other signalling purposes. This is clearly shown in Tables 5 and 6 for each of the two modulation schemes, 16 QAM and QPSK.

The second advantage is that if the original 4 signalling bits are still used as previously proposed, the number of combinations in signalling value, that is for the redundancy version in the case of 16 QAM may be used to create more flexibility for Node-B (BTS 10) to select from, given the same signalling requirements. Thus, an extra eight signalling values created by the use of the fourth bit may be obtained using the merging of the new data indicator and signalling value fields. This is shown in Tables 7 and 8 where a total of 16 combinations may be used rather than 8 as originally proposed.

It is observed that in the first transmission when the new data indicator or NDI=1 the self-decodable transmission, that is when s=1, must be used. This is because systematic bits are considered more important than parity bits. Thus when s=1, parity 1 and parity 2 bit streams are endeavoured to be punctured but not the systematic bit stream. Because it does not matter which redundancy version is used, without loss of generality it can be assumed that r=0. In the current draft 3GPP Technical Report "bits collection" and "second interleaver" have been designated so that b=0 corresponds to SMP (Symbol Mapping Method based on Priority).

Therefore the combination where s=1, r=0 and b=0 can be used as a default for the first transmission without any loss of generality. Furthermore, "Incremental redundancy" in the RV parameters and "Constellation rearrangement" using the b parameter have been designed primarily for use in retransmissions when the new data indicator=0.

Thus from Tables 5 and 6 it can be seen that the number of signalling bits used is reduced taking into account the NDI bit which results in improved signalling performance whereby the additional bit or bits can be used for other purposes such as coding. This is with the assumption that there is no need for increasing the number of combinations for Node B to use. In Table 6 there is no need for any b parameters as the QPSK modulation scheme has a signalling requirement which is not as restrictive as 16 QAM. With regard to Table 7 and 8 there is shown the expansion of signalling value from 8 to 16 values when taking into account the NDI bit. The signalling values 0 through to 5 and 8, 12, 14 and 15 are current combinations which are shown in bold phase type. The other signalling values 6, 7, 9, 10, 11 and 13 are expanded combinations taking the NDI bit into consideration. Again with Table 8, which is for QPSK, there is no requirement for b parameters.

A second preferred embodiment addresses the problem of poor orthogonality between self-decodable and non self-decodable redundancy versions, the current $X_{rv}$, HS-SCH performance is sub-optimal for the case of 16 QAM. A new selection of $X_{rv}$ should be used to provide more optimal performance for HS-DSCH. The second embodiment, in a first part, aims to alleviate this disadvantage. Furthermore, there is a need for increasing the number of $X_{rv}$ so that the HS-DSCH performance can be further optimised. A new signalling proposal that exploits the "redundancy information" in a 1 bit new data indicator is therefore used. By merging this information and the s, r and b parameters, the new signalling proposal supports 16 $X_{rv}$ and thus allows more flexibility in optimising the performance of HS-DSCH in different situations requiring the same total number of signalling bits currently used.

The current formula for $e_{ini}$ calculation provides good orthoginality between self-decodable redundancy versions and between non self-decodable redundancy versions. However, the current choice of signalling values gives a poor orthoginality between self-decodable and non self-decodable redundancy versions, which means that using both of these types in transmissions will result in sub-optimal performance for the high speed downlink shared channel (HS-DSCH). Thus, it is proposed to provide a choice of signalling values that provides better orthogonality between self-decodable and non self-decodable redundancy versions and thus better performance for HS-DSCH than the current proposal. It is also observed that even if this new choice is optimal, it may only be optimal for the case where first rate matching is transparent. Therefore, it is desirable to have additional combinations of s, r and b to ensure better optimisation.

The following is a discussion and proposal on the optimal selection of $X_{rv}$. One of the most basic motivations behind the HARQ related proposals (IR, ZoRe, the formula for $e_{ini}$ calculation . . . ) is that the more uniform energy distribution in the combined trellis, the better performance is generally obtained. In example 1 below, it is shown that current signalling is not in line with this basic principle when both self-decodable and non self-decodable versions are used in the subsequent transmissions. Here it is assumed that first rate matching is transparent as disclosed in the reference R1-02-0273 meeting 24 "DL signalling for 2-stage rate matching and BcRe" Panasonic. Non transparent first rate matching will be discussed further on in this description.

In each of the following examples 1, 2 and 3, the sequence of four transmissions will be used as recommended in Table 6 of the aforementioned reference for use in case of 16 QAM medium to high coding rate. The first and third transmissions use self-decodable (s=1) with different r, the second and fourth transmissions use non self-decodable (s=0) with a differing r.

EXAMPLE 1

Let us consider the parity 1 trellises of 4 transmissions, where 16 QAM with coding rate 5/8 ($N_{p1}=N_{sys}=1200$, $N_{data}=1920$) and 3/4 ($N_{p1}=N_{sys}=1440$, $N_{data}=1920$) are used. Note that $r_{max}=2$. In each of the following Tables (including those in Examples 2 and 3), a dark square indicates a punctured position and a position indicated by 'OK' is a passed or transmitted packet.

| | | | | | | | | | | | | | | | | | | |
|---|---|---|---|---|---|---|---|---|---|---|---|---|---|---|---|---|---|---|
| s = 1, r = 0 | P | OK | P | P | P | OK | P | P | OK | P | P | OK | P | P | P | OK | P | P |
| s = 0, r = 0 | OK | OK | P | OK | OK | OK | OK | P | OK | OK | OK | OK | P | OK | OK | OK | OK | P |
| s = 1, r = 1 | OK | P | P | OK | P | P | OK | P | P | P | OK | P | P | OK | P | P | OK | P |
| s = 0, r = 1 | OK | OK | OK | OK | P | OK | OK | OK | OK | P | OK | OK | OK | OK | P | OK | OK | OK |
| Rate 5/8 | | | | | | | | | | | | | | | | | | |
| s = 1, r = 0 | P | P | P | OK | P | P | P | P | P | OK | P | P | P | P | P | OK | P | P |
| s = 0, r = 0 | OK | P | OK | OK | P | OK | OK | P | OK | OK | P | OK | OK | P | OK | OK | P | OK |
| s = 1, r = 1 | OK | P | P | P | P | P | OK | P | P | P | P | P | OK | P | P | P | P | P |
| s = 0, r = 1 | OK | OK | P | OK | OK | P | OK | OK | P | OK | OK | P | OK | OK | P | OK | OK | P |
| Rate 3/4 | | | | | | | | | | | | | | | | | | |

It can be seen that current signalling gives poor orthogonality between self-decodable and non self-decodable redundancy versions. As a result, there is still punctured positions in the combined trellis after 3 transmissions while other positions have already been repeated, which lead to a clear energy unbalance in the combined trellis after 2, 3 and 4 transmissions.

In the Example 2 below it is shown that by using a new choice of $X_{rv}$ gives better orthogonality and more uniform distribution of the combined trellis (and thus better HS-DSCH performance) than that in Example 1.

EXAMPLE 2

Consider the parity 1 trellises of 4 transmissions, where 16 QAM with coding rate 5/8 ($N_{p1}=N_{sys}=1200$, $N_{data}=1920$) and 3/4 ($N_{p1}=N_{sys}=1440$, $N_{data}=1920$) are used. Note that $r_{max}=4$.

TABLE 9

Table for 16 QAM-Option 1

| $X_{rv}$ (value) | NDI | s | r | b |
|---|---|---|---|---|
| 0 | 1 | 1 | 0 | 0 |
| 1 | 0 | 1 | 0 | 1 |
| 2 | 0 | 1 | 0 | 2 |
| 3 | 0 | 1 | 0 | 3 |
| 4 | 0 | 1 | 2 | 0 |
| 5 | 0 | 1 | 2 | 1 |
| 6 | 0 | 0 | 1 | 0 |
| 7 | 0 | 0 | 3 | 1 |

Hereinafter is a description for a proposal on the expansion of signalling capacity. As mentioned previously, the choice of $8X_{rv}$ proposed in the above mentioned Panasonic reference is based on assumption that the first rate matching

| | | | | | | | | | | | | | | | | | | |
|---|---|---|---|---|---|---|---|---|---|---|---|---|---|---|---|---|---|---|
| s = 1, r = 0 | P | OK | P | P | P | OK | P | P | OK | P | P | OK | P | P | P | OK | P | P |
| s = 0, r = 1 | OK | P | OK | OK | OK | OK | P | OK | OK | OK | OK | P | OK | OK | OK | OK | P | OK |
| s = 1, r = 2 | OK | P | P | OK | P | P | OK | P | P | P | OK | P | P | OK | P | P | OK | P |
| s = 0, r = 3 | OK | OK | OK | P | OK | 0K | OK | OK | P | OK | OK | OK | OK | P | OK | OK | OK | OK |
| Rate 5/8 | | | | | | | | | | | | | | | | | | |
| s = 1, r = 0 | P | P | P | OK | P | P | P | P | P | OK | P | P | P | P | P | OK | P | P |
| s = 0, r = 1 | P | OK | OK | P | OK | OK | P | OK | OK | P | OK | OK | P | OK | OK | P | OK | OK |
| s = 1, r = 2 | OK | P | P | P | P | P | OK | P | P | P | P | P | OK | P | P | P | P | P |
| s = 0, r = 3 | OK | OK | P | OK | OK | P | OK | OK | P | OK | OK | P | OK | OK | P | OK | OK | P |

Rate 3/4

It can be seen that there is much better orthogonality between self-decodable and non self-decodable redundancy versions. As a result, all bits are transmitted after 3 transmissions. There is also a good uniform energy distribution in the combined trellis after 2, 3 and 4 transmissions. The link level simulation results (see FIG. 3 show that Example 2 gives about 0.2 dB performance improvement over the Example 1. The simulation uses current working assumptions as in TR 25.858 V 1.1.2. The values of parameter b used in the transmissions are the same as in Table 6 of the Panasonic reference.

Therefore, it is recommended that the following minimum signalling set, listed in Table 9 below, should be used. Note that now $r_{max}=4$ for 16 QAM.

is transparent. In the example 3 below it is shown that even though the new set of $X_{rv}$ in Table 9 provides more optimal performance than the current signalling, it may become sub-optimal if a non transparent first rate matching is considered.

The choice of $8X_{rv}$ proposed in the Panasonic reference is based on assumption that the first rate matching is transparent. In the Example 3 below, we show that even though the new set of $X_{rv}$ in Table 9 provides more optimal performance than the current signalling, it may become sub-optimal if a non-transparent first rate matching is considered.

EXAMPLE 3

Consider the parity 1 trellises of 4 transmissions, where 16 QAM with coding rate 3/4 ($N_{sys}=1440$, $N_{data}=1920$) is used. We assume that UE capability is limited so that $N_{p1}=1200$. Note that $r_{max}=4$.

| | | | | | | | | | | | | | | | | | | |
|---|---|---|---|---|---|---|---|---|---|---|---|---|---|---|---|---|---|---|
| s = 1, r = 0 | P | P | OK | P | P | P | P | OK | P | P | P | P | OK | P | P | P | P | OK |
| s = 0, r = 1 | OK | P | OK | OK | OK | OK | P | OK | OK | OK | OK | P | OK | OK | OK | OK | P | OK |
| s = 1, r = 2 | OK | P | P | P | P | OK | P | P | P | P | OK | P | P | P | P | OK | P | P |
| s = 0, r = 3 | OK | OK | OK | P | OK | OK | OK | OK | P | OK | OK | OK | OK | P | OK | OK | OK | OK |
| Even new proposed signalling is sub-optimal | | | | | | | | | | | | | | | | | | |
| s = 1, r = 0 | P | P | OK | P | P | P | P | OK | P | P | P | P | OK | P | P | P | P | OK |
| s = 0, r = 0 | OK | OK | P | OK | OK | OK | OK | P | OK | OK | OK | OK | P | OK | OK | OK | OK | P |
| s = 1, r = 1 | P | P | P | OK | P | P | P | P | OK | P | P | P | P | OK | P | P | P | P |
| s = 0, r = 3 | OK | OK | OK | P | OK | OK | OK | OK | P | OK | OK | OK | OK | P | OK | OK | OK | OK |
| Optimal sequence is not supported by minimum set of $8X_{rv}$ | | | | | | | | | | | | | | | | | | |

It can be seen that a sequence, which is optimal in case of transparent first rate matching, becomes sub-optimal in case of non-transparent first rate matching (there are punctured positions in the combined trellis after 3 transmissions). The optimal sequence for non-transparent first rate matching allows all bits to be transmitted after 2 transmissions and provides perfect uniform distributions in the combined trellis after 2 and 4 transmissions. However the parameters of $2^{nd}$ and $3^{rd}$ transmissions of this sequence are not in the minimum signalling set (s=0 and r=0, s=1 and r=1). Therefore, it is desirable to have more combinations $X_{rv}$ so that Node B can make an optimal choice for different cases.

As mentioned previously, 5 bit signalling (32 $X_{rv}$) would be needed for signalling the parameters s, r and b that is 1 bit for s, 2 bits for r and 2 bits for b. However, simulation studies in the above mentioned Panasonic reference and a Siemens reference "R1-02, 0276 meeting" number 24 "signalling of $R_{rv}$ and CoRe for HSDPA", have shown that the number of effective combinations can be reduced from 32 $X_{rv}$ to $8X_{rv}$ and 4 $X_{rv}$ respectively to fit the initial limit that only 2 bits should be used for signalling. Though the scheme mentioned in the Panasonic reference uses 3 bits, the performance of HS-SCCH only slightly degrades. More importantly, it provides better performance optimisations for HS-DSCH, which currently assumes up to 8 transmissions, than the proposal in the Siemens reference. It is because with $4X_{rv}$, Node B must re-use the combinations after at most 4 transmissions, it also means that Chase combining is used in the subsequent transmissions and performance after 4 transmissions is sub-optimal. Even though the situation has improved with 8 $X_{rv}$, Node-B still has to use sub-optimal Chase combining after at least 5 transmissions (see Table 6 and 7 in the Panasonic reference). Therefore, it is desirable to have more combinations of $X_{rv}$ so that Node-B can always make an optimal choice for up to 8 transmissions.

Having discussed the need for extra combinations to be included in the signalling for HARQ, it is proposed that the new signalling scheme that provides 16 $X_{rv}$ requires the same number of bits for signalling as currently used.

As disclosed with reference to the first embodiment it is observed that in the first transmission when a new data indicator NDI=1, the self-decodable transmission must be used or s=1. This is where the systematic bits are considered more important than parity bits. Furthermore it does not matter which redundancy version should be used. Therefore, without loss of generality it can be assumed that r=0. In the reference TR25.858 V 1.1.2, "bits collection" and "second interleaver" have been designed so that b=0 corresponds to SMP.

Therefore the combination of s=1, r=0 and b=0 can be used as a default for the first transmission without any loss of generality (see also Tables 6 to 8 in the reference).

"Increment redundancy" and "Constellation rearrangement" have been designed primarily for use in retransmissions when NDI=0. "It is also observed that all parameters NDI, s, r and b are HARQ related information, equally important in terms of timing and correctness.

From the observations, the NDI, s, r and b fields are merged into a new signalling format to increase the signalling capacity by effectively removing the redundancy of NDI. Taking into account the above discussions on the optimality of the choice of $X_{rv}$, the new signalling scheme is as proposed in Table 10 below.

TABLE 10

Redundancy version coding for 16 QAM

| $X_{rv}$ (value) | NDI | s | r | b |
|---|---|---|---|---|
| 0 | 1 | 1 | 0 | 0 |
| 1 | 0 | 1 | 0 | 1 |
| 2 | 0 | 1 | 0 | 2 |
| 3 | 0 | 1 | 0 | 3 |
| 4 | 0 | 1 | 2 | 0 |
| 5 | 0 | 1 | 2 | 1 |
| 6 | 0 | 1 | 2 | 2 |
| 7 | 0 | 1 | 2 | 3 |
| 8 | 0 | 0 | 1 | 0 |
| 9 | 0 | 0 | 3 | 1 |
| 10 | 0 | 0 | 1 | 1 |
| 11 | 0 | 0 | 3 | 0 |
| 12 | 0 | 1 | 1 | 0 |
| 13 | 0 | 1 | 1 | 1 |
| 14 | 0 | 0 | 0 | 0 |
| 15 | 0 | 0 | 0 | 1 |

The selected values in each of Tables 9 and 10 provide more optimal performance than the current signalling values by ensuring better orthogonality between self-decodable and non self-decodable redundancy versions. Each of Table 9 and Table 6 show the reduction in the number of signalling bits by taking the NDI bit into account, with the assumption that there is no need for increasing the number of combinations. Table 10 shows the expansion of signalling value by taking into account the NDI bit. The signalling values 0 through to 11 identified in bold are optimal choices for up to eight transmissions in the case of transparent matching and where the coding rate is less than 3/4. The signalling values 12, 13, 14 and 15 are provisional combinations which can be used to optimise the performance in the case of non-transparent first rate matching and/or where the coding rate is more than 3/4. Because the signalling requirement for QPSK is much less than for 16 QAM, where there is no need to increase signalling for QPSK then Table 8 can be used to obtain the common signalling format for HARQ.

In conclusion using the same available number of bits for downlink HARQ signalling, the new signalling scheme with 16 $X_{rv}$ provides better performance and more flexibility in performance optimisation for HS-DSCH. Thus, with the second embodiment it is seen that in the first option if there is no need to increase the number of combinations (i.e redundancy version), the number of bits for HARQ signalling requirements can be reduced. One bit can therefore be saved and this saved bit can be used for other signalling types or for improving performance of the signalling channel. That is, better channel coding for HS-SCCH. In option 2 by keeping the number of signalling bits the same as currently used, the number of combinations can be increase (i.e. redundancy version) in the case of 16 QAM in order to create more flexibility for Node-B to select such combinations. This further optimises the performance of H-DSCH.

Those skilled in the art will appreciate that there may be many variations and modifications of the above-described signalling scheme without departing from the ambit of the present invention as defined in the claims appended hereto.

The claims defining the invention are as follows:

1. A method of signalling in a mobile communications network from a base station to a mobile station using Hybrid Automatic Repetition Request (HARQ), said method comprising the steps of:
    selecting, at said base station, a code that indicates transmission of new data or retransmitted data;
    providing in said code combinations of redundancy version parameters and/or bit rearrangement parameters; and
    transmitting the selected code to said mobile station,
    wherein the selected code has the effect of increasing the number of available combinations or reducing the number of bits required for HARQ signalling.

2. A method according to claim 1 further comprising the step of merging a new data indicator field with signalling values $X_{r,v}$ that define each of said combinations.

3. A method according to claim 2 wherein when the new data indicator has a value of 1, it indicates a new data transmission.

4. A method according to claim 2 wherein when the new data indicator has a value of zero, it indicates retransmitted data.

5. A method according to claim 1 wherein the redundancy version parameters are s and r, where s=1 indicates a self-decodable transmission and s=0 indicates a non-self-decodable transmission.

6. A method according to claim 1 wherein the selected code includes combinations of at least one of a self-decodable indicator, a redundancy version indicator and bit rearrangement parameter in order to improve orthogonality between self-decodable and non self-decodable redundancy versions.

7. A method according to claim 1 wherein in a first transmission when the new data indicator has a value of 1, parameter s also has a value of 1.

8. A method according to claim 1 wherein in said first transmission r has a value of zero and a bit rearrangement parameter b has value of zero.

9. A method according to claim 1 wherein the signalling values representing the combinations are defined by either 3 bits, providing up to eight combinations, or 4 bits, providing up to sixteen combinations.

10. A method according to claim 9 wherein when the selected code has the effect of increasing the number of available combinations, 4 bits are used.

11. A method according to claim 9 wherein when the selected code has the effect of reducing the number of bits required for HARQ signalling, 3 bits are used.

12. A method according to claim 1 wherein QPSK or 16 QAM are used as a modulation scheme for transmitting the selected code.

13. A mobile communications signalling system which uses Hybrid Automatic Repetition Request (HARQ), comprising:
    one or more base stations;
    one or more mobile stations in radio communication with said base stations;
    wherein at one of said base stations, a code is selected that indicates transmission of new data or retransmitted data; and
    in said code there is provided combinations of redundancy version parameters and/or bit arrangement parameters;
    said selected code being transmitted to at least one of said mobile stations and having the effect of increasing the number of available combinations or reducing the number of bits required for HARQ signalling.

14. A mobile communications signalling system according to claim 13, wherein the system forms part of a high speed downlink packet access (HSDPA).

* * * * *